UNITED STATES PATENT OFFICE.

DAVID FLANDERS, OF SING SING, NEW YORK.

PROCESS OF CHANGING THE BEARING YEARS OF FRUIT-TREES.

SPECIFICATION forming part of Letters Patent No. 240,115, dated April 12, 1881.

Application filed January 29, 1881. (No specimens.)

*To all whom it may concern:*

Be it known that I, DAVID FLANDERS, of Sing Sing, in the county of Westchester and State of New York, have invented a new and Improved Process of Changing the Bearing Years of Fruit-Trees, of which the following is a full, clear, and exact description.

It is well known that fruit-trees, especially apple and pear trees, bear heavy crops of fruit on alternate years, and but very light crops on the intermediate years, so that in the bearing years apples are a drug on the market, and in many localities will not pay for the cost of gathering them; consequently the apple-grower realizes little or no money from a most abundant crop, while in the intermediate years the trees that have nearly exhausted their vitality the year before by such abundant fruiting produce but little or no fruit, so that, though the prices rule high, the apple-grower can obtain but small returns from his crop, because of its poverty. Could the so-called "bearing years" be changed—could the trees be made fruitful by any means or process in the intermediate or barren years—those applying the process to their trees would have the heaviest fruit-crop when the prices were highest.

The object of this invention is to accomplish this result; and the invention consists in applying to the blossoms of the trees in the spring of the bearing year, by sprinkling or otherwise, acid or alkaline solutions of sufficient strength to check the development and destroy the vitality of said blossoms, and to cause them to gradually fall off, said solution being, however, sufficiently diluted so as not to injure the tree.

Dilute solutions of sulphuric, hydrochloric, or nitric acids, or of caustic potash or lime, are found to be effective in removing the blossoms, and solutions of sulphate of iron, zinc, or copper are also very effective; but of all these I prefer to use a solution of sulphate of iron in water, in about the proportions of one pound of the former to ten gallons of the latter. I have found that the leaves and blossoms of an apple-tree of ordinary vigorous growth that have been thoroughly sprinkled with this solution of sulphate of iron in water will all fall off in from four to seven days after the application; and 1 have found that a stronger solution is required to produce a like effect on young apple-trees of unusual vigor, while a more dilute solution will produce the effect on older or less vigorous trees. The tree will remain bare for a period of from two to four weeks, or thereabout, after the falling of its leaves and blossoms, and at the end of that time, the length of which is affected by the dryness or moisture of the atmosphere, it begins to put out new leaves, that grow and mature in the usual manner, but no blossoms; hence the tree that gave promise of an abundant crop of fruit in the bearing year will produce nothing. On the succeeding or intermediate year, however, the tree that had been so stripped of its blossoms will blossom most abundantly and bear and mature a large crop of fruit. The year succeeding the bearing year of the tree, the tree will be barren or produce but little fruit, while on the year next succeeding it will again produce fruit in abundance, and so on from year to year the bearing and barren years will alternate according to the relative change established by the one application of the leaf and blossom killing solution.

If a tree be infested with the canker-worm or other insects they and their eggs are destroyed by this alkaline or acid solution, while the tree itself remains uninjured.

I prefer to use a solution of sulphate of iron in this process, because of its cheapness, and because its operation or effect is more gradual, and for the reason that the oxide of iron deposited by its evaporation seems to be beneficial rather than injurious to the growth of the tree, and to keep it more free from disease and insects.

Having thus described my invention, I claim as new and desire to secure by Letters Patent—

The process, substantially as herein described, of destroying the vitality of the blossoms of fruit-trees, which consists in applying thereto an acid or alkaline solution of sufficient strength to destroy the vitality of said blossoms without injuring the tree, whereby the bearing year of the tree may be changed, as set forth.

DAVID FLANDERS.

Witnesses:
NATHANIEL HYATT,
GEORGE W. BLAIR.